(12) United States Patent
Palmas et al.

(10) Patent No.: US 8,936,756 B2
(45) Date of Patent: *Jan. 20, 2015

(54) APPARATUS FOR VENTING A CATALYST COOLER

(75) Inventors: Paolo Palmas, Des Plaines, IL (US); Daniel N. Myers, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 175 days.

This patent is subject to a terminal disclaimer.

(21) Appl. No.: 13/036,660

(22) Filed: Feb. 28, 2011

(65) Prior Publication Data

US 2012/0219467 A1 Aug. 30, 2012

(51) Int. Cl.
| | | |
|---|---|---|
| *B01J 8/18* | (2006.01) | |
| *B01J 8/38* | (2006.01) | |
| *B01J 29/90* | (2006.01) | |
| *B01J 38/34* | (2006.01) | |
| *B01J 8/00* | (2006.01) | |
| *B01J 8/24* | (2006.01) | |
| *B01J 8/26* | (2006.01) | |
| *B01J 38/00* | (2006.01) | |
| *B01J 38/30* | (2006.01) | |
| *B01J 38/32* | (2006.01) | |
| *C10G 11/00* | (2006.01) | |
| *C10G 11/18* | (2006.01) | |

(52) U.S. Cl.
CPC ............ *B01J 38/32* (2013.01); *B01J 8/1836* (2013.01); *B01J 8/388* (2013.01); *B01J 29/90* (2013.01); *B01J 38/30* (2013.01); *B01J 38/34* (2013.01); *C10G 11/182* (2013.01); *B01J 2208/00176* (2013.01); *B01J 2208/00185* (2013.01); *B01J 2208/00292* (2013.01)

USPC .................... 422/144; 422/19; 422/139

(58) Field of Classification Search
CPC ............ B01J 7/00; B01J 8/00; B01J 8/0055; B01J 8/008; B01J 8/18; B01J 8/1818; B01J 8/1827; B01J 8/1872; B01J 8/26; B01J 19/00; B01J 2523/00; B01J 29/90; B01J 20/34; B01J 8/1836; B01J 8/24; B01J 8/28; B01J 8/30; B01J 20/00; B01J 20/30; B01J 21/00; B01J 21/20; B01J 23/00; B01J 23/90; B01J 23/92; B01J 23/94; B01J 23/96; B01J 25/00; B01J 25/04; B01J 25/28; B01J 25/285; B01J 25/30; B01J 25/32; B01J 29/00; B01J 31/00; B01J 31/40; B01J 38/00; B01J 38/30; B01J 38/32; B01J 2208/00; B01J 2208/00008; B01J 2208/00017; B01J 2208/001
USPC .......................................... 422/129, 139, 144
See application file for complete search history.

(56) References Cited

U.S. PATENT DOCUMENTS 4,197,189 A 4/1980 Thompson et al.
4,238,631 A * 12/1980 Daviduk et al. ............... 585/469

(Continued)

OTHER PUBLICATIONS

U.S. Appl. No. 13/036,603, filed Feb. 28, 2011, Palmas et al.

(Continued)

*Primary Examiner* — Natasha Young

(57) ABSTRACT

The apparatus herein provide a catalyst cooler with a vent that communicates fluidizing gas to a lower chamber of a regenerator. Air that is used as fluidizing gas can then be consumed in the regenerator without promoting after burn in the upper chamber.

20 Claims, 1 Drawing Sheet

(56) References Cited

U.S. PATENT DOCUMENTS

| | | | |
|---|---|---|---|
| 4,325,833 A | | 4/1982 | Scott |
| 4,336,160 A | | 6/1982 | Dean et al. |
| 4,396,531 A | * | 8/1983 | Lomas ............................ 502/22 |
| 4,413,573 A | | 11/1983 | Hall et al. |
| 4,425,301 A | * | 1/1984 | Vickers et al. ................. 422/111 |
| 4,710,357 A | * | 12/1987 | Cetinkaya et al. ............. 422/144 |
| 4,757,039 A | * | 7/1988 | Lomas ............................ 502/41 |
| 4,867,950 A | | 9/1989 | Harandi et al. |
| 4,885,138 A | * | 12/1989 | Lomas ............................ 422/144 |
| 4,923,834 A | * | 5/1990 | Lomas ............................ 502/41 |
| 5,087,596 A | | 2/1992 | Clark et al. |
| 5,154,819 A | | 10/1992 | Clark et al. |
| 5,409,872 A | | 4/1995 | Raterman |
| 5,421,398 A | * | 6/1995 | Lomas ..................... 165/104.18 |
| 5,452,757 A | * | 9/1995 | Lomas ..................... 165/104.16 |
| 6,149,875 A | | 11/2000 | Rao et al. |
| 6,656,344 B1 | | 12/2003 | Rao et al. |
| 8,609,566 B2 | * | 12/2013 | Palmas et al. ................... 502/44 |
| 2006/0149108 A1 | | 7/2006 | Miller |

OTHER PUBLICATIONS

Myers, Declaration of Daniel N. Myers dated Mar. 9, 2011 for U.S. Appl. No. 13/036,660.

Fernandes, "Steady state multiplicity in an UOP FCC unit with high-efficiency regenerator", Chemical Engineering Science, v 62, n 22, p. 6308-6322, Nov. 2007.

Hoke, "Emissions From Pressurized Fluidized-Bed Coal Combustion", MITRE Corp (M76-36), p. 559-576, 1976, Conference: Proc of the Int Conf on Fluid-Bed Combust, 4th, Dec. 9, 1975-Dec. 11, 1975.

Letzsch, "Clean fuels: Special report: Improve catalytic cracking to produce clean fuels", Hydrocarbon Processing, v 84, n 2, p. 77-78, 80-81, Feb. 2005.

Luckenbach, "Commercial Experience in Updating Catalytic Cracking Units", 85th AICHE Natl. Meet. (Phila. Jun. 4-8, 1978) PREPR. N.69D 33P, Jun. 4, 1978.

Sapienza, "Upgrade of the ubwpad multiple hearth furnace sludge incinerators", Journal of New England Water Environment Association, v 42, n 4, p. 24-27+46-50, Winter 2008.

* cited by examiner

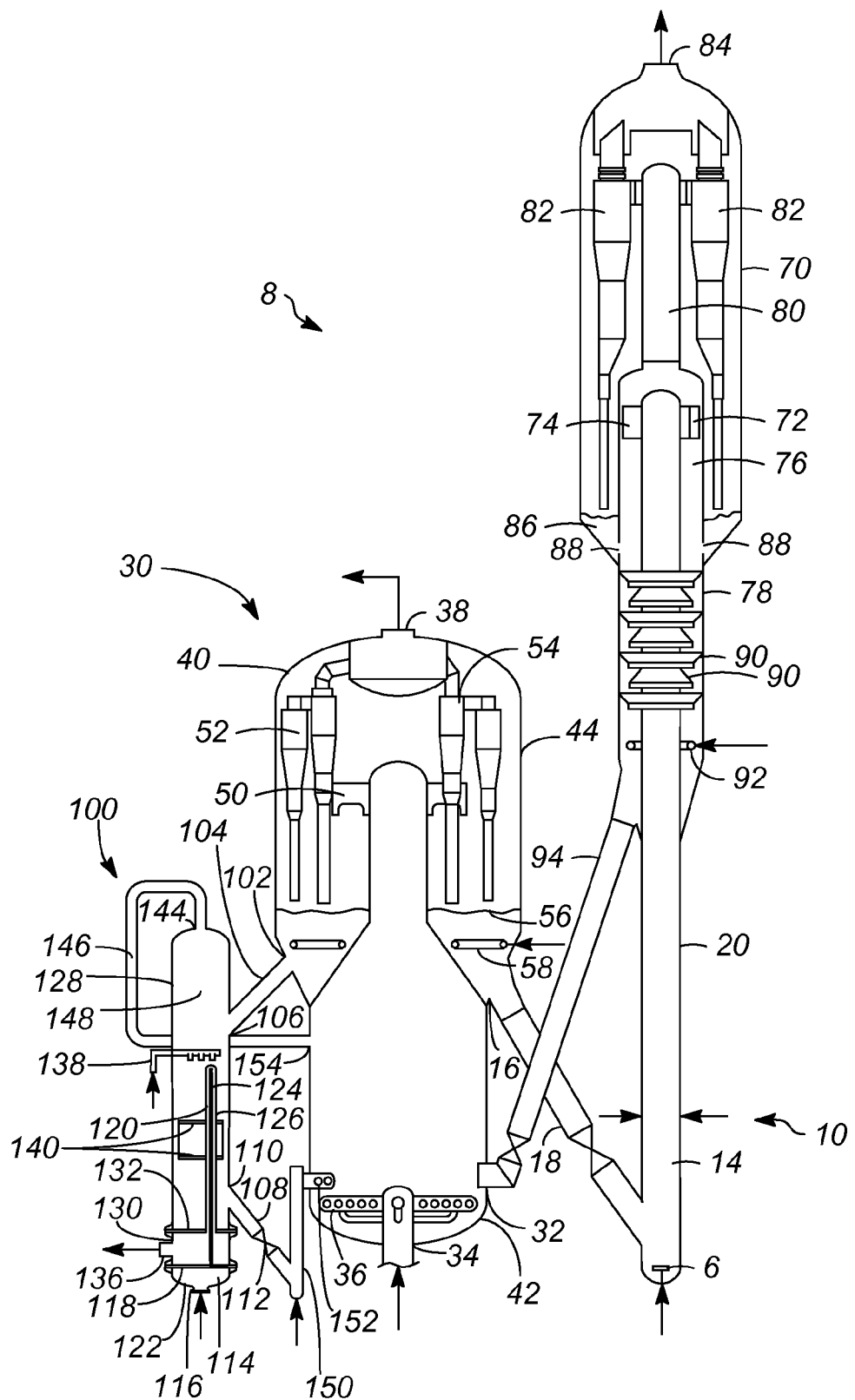

APPARATUS FOR VENTING A CATALYST COOLER

FIELD OF THE INVENTION

The field of the invention is regenerating catalyst in a fluid catalytic cracking (FCC) unit.

BACKGROUND OF THE INVENTION

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel.

There are several types of catalyst regenerators in use today. The conventional bubbling bed regenerator typically has just one chamber in which air is bubbled through a dense catalyst bed. Coked catalyst is added and regenerated catalyst is withdrawn from the same dense catalyst bed. Relatively little catalyst is entrained in the combustion gas exiting the dense bed.

Two types of regenerators have two chambers. Two-stage bubbling beds have two chambers. Coked catalyst is added to a dense bed in a first, upper chamber and is partially regenerated with air. The partially regenerated catalyst is transported to a dense bed in a second, lower chamber and completely regenerated with air. The completely regenerated catalyst is withdrawn from the second chamber.

Complete catalyst regeneration can be performed in a dilute phase, fast-fluidized, combustion regenerator. Coked catalyst is added to a lower chamber and is transported upwardly by air under fast fluidized flow conditions while completely regenerating the catalyst. The regenerated catalyst is separated from the flue gas by a primary separator upon entering into an upper chamber in which regenerated catalyst and flue gas are disengaged from each other. Only a small proportion of air added to the regenerator vessel is added to the upper chamber. U.S. Pat. No. 4,197,189 and U.S. Pat. No. 4,336,160 teach a riser combustion zone in which fast fluidized flow conditions are maintained to effect complete combustion without the need for the additional combustion in the catalyst bed collected from the top of the riser.

After burn is a phenomenon that occurs when hot flue gas that has been separated from regenerated catalyst contains carbon monoxide that combusts to carbon dioxide. After burn can be a risk in an upper, disengaging chamber which contains hot flue gas that has been disengaged from catalyst, thereby providing a dilute catalyst phase. In this dilute phase of catalyst, insufficient catalyst is present to serve as a heat sink to absorb the heat of combustion thus subjecting surrounding equipment to potentially damaging higher temperatures and perhaps creating an atmosphere conducive to the generation of nitrous oxides.

Catalyst coolers have been used to cool regenerated catalyst and permit the regenerator and the reactor to operate under independent conditions. In catalyst coolers, hot regenerated catalyst is cooled by indirect heat exchange with water which vaporizes to steam. The steam is removed from the catalyst cooler for other uses; whereas, the cooled catalyst is returned to the regenerator. Air used to fluidize catalyst in the catalyst cooler can be vented to the regenerator.

Background to this invention is a catalyst cooler with a vent in communication with an upper chamber of a regenerator vessel. Air for fluidizing catalyst in the catalyst cooler and vented to the upper chamber can provide an oxidation agent for after burn.

Ways are sought to efficiently utilize air to fluidize hot catalyst in catalyst coolers for regenerators.

SUMMARY OF THE INVENTION

In an apparatus embodiment, the invention comprises a catalyst regenerator comprising a regenerator vessel having an inlet for catalyst and combustion gas, a regenerated catalyst outlet, a cooler catalyst outlet, a flue gas outlet, an upper chamber and a lower chamber. Also included is a catalyst cooler having a hot catalyst inlet in communication with the cooler catalyst outlet of the regenerator vessel. The catalyst cooler has a gas distributor, a vent, a cooled catalyst exit and a plurality of heat exchange tubes in the catalyst cooler for carrying heat exchange fluid. A vent pipe communicates the vent with the regenerator vessel. The improvement of the invention is the vent pipe communicates the vent with the lower chamber of the regenerator vessel.

In an additional apparatus embodiment, the invention comprises a catalyst regenerator comprising a regenerator vessel having an inlet for catalyst and combustion gas, a regenerated catalyst outlet, a cooler catalyst outlet, a flue gas outlet, an upper chamber and a lower chamber. Also included is a catalyst cooler having a hot catalyst inlet in communication with the cooler catalyst outlet of the regenerator vessel. The catalyst cooler has a gas distributor, a vent spaced above the hot catalyst inlet to provide a disengaging portion, a cooled catalyst exit and a plurality of heat exchange tubes in the catalyst cooler for carrying heat exchange fluid. A vent pipe communicates the vent with the regenerator vessel. The improvement of the invention is the vent pipe communicates the vent with the upper chamber of the regenerator vessel.

In a further apparatus embodiment, the invention comprises a catalyst regenerator comprising a regenerator vessel having an inlet for catalyst and combustion gas in a combustor chamber, a regenerated catalyst outlet and a flue gas outlet in a disengaging chamber and a cooler catalyst outlet provided in the disengaging chamber. Also included is a catalyst cooler having a hot catalyst inlet in communication with the cooler catalyst outlet of the regenerator vessel. The catalyst cooler has a vent, a cooled catalyst exit and a plurality of heat exchange tubes in the catalyst cooler for carrying heat exchange fluid. A vent pipe communicates the vent with the regenerator vessel. The improvement of the invention is the vent pipe communicates with the combustor chamber.

BRIEF DESCRIPTION OF THE DRAWING

The FIGURE is a schematic drawing of an FCC unit of the present invention.

DETAILED DESCRIPTION OF THE INVENTION

We have found that venting air from a catalyst cooler to a lower chamber instead of an upper chamber of a regenerator minimizes the after burn that can result in venting the cooler to the upper regenerator. Venting air to the lower chamber allows it to be consumed in the combustion of coke on spent catalyst.

As shown in the FIGURE, an FCC unit 8 may be used in the FCC process. Hydrocarbon feedstock may be sprayed by distributors 10 into a riser 20 where it contacts catalyst. In general, feedstock may be cracked in the riser 20 in the presence of catalyst to form a cracked product stream.

A conventional FCC feedstock is a suitable feed to the riser 20. The most common of such conventional feedstocks is a "vacuum gas oil" (VGO), which is typically a hydrocarbon material having a boiling range of from 343° to 552° C. (650° to 1025° F.) prepared by vacuum fractionation of atmospheric residue. Heavier hydrocarbon feedstocks may also be used in the present invention. Conventional FCC feedstock may be vaporized and sprayed in the riser by the distributors 10.

As shown in the FIGURE, regenerated catalyst is delivered to the riser 20 from regenerator standpipe 18. In an embodiment, lift gas which may include inert gas such as steam may be distributed by lift gas distributor 6 to lift catalyst upwardly from a lower section 14 of the riser 20. Feed sprayed from a distributor 10 contacts lifted, fluidized catalyst and moves upwardly in the riser 20 as the hydrocarbon feed cracks to smaller hydrocarbon cracked products. The cracked products and spent catalyst enter the reactor vessel 70 and are then discharged from the top of the riser 20 through the riser outlet 72 and separated into a cracked product vapor stream and a collection of catalyst particles covered with substantial quantities of coke and generally referred to as spent catalyst. A swirl arm arrangement 74, provided at the end of the riser 20, may further enhance initial catalyst and cracked hydrocarbon separation by imparting a tangential velocity to the exiting catalyst and cracked product vapor stream mixture. The swirl arm arrangement 74 is located in an upper portion of a separation chamber 76, and a stripping zone 78 is situated in the lower portion of the separation chamber 76. Catalyst separated by the swirl arm arrangement 74 drops down into the stripping zone 78.

The cracked product vapor stream comprising cracked hydrocarbons including naphtha, light olefins and some catalyst may exit the separation chamber 76 via a gas conduit 80 in communication with cyclones 82. The cyclones 82 may remove remaining catalyst particles from the product vapor stream to reduce particle concentrations to very low levels. The product vapor stream may exit the top of the reactor vessel 70 through a product outlet 84. Catalyst separated by the cyclones 82 returns to the reactor vessel 70 through diplegs into a dense bed 86 where catalyst will pass through chamber openings 88 and enter the stripping zone 78. The stripping zone 78 removes adsorbed and entrained hydrocarbons from the catalyst by counter-current contact with inert gas such as steam over the optional baffles 90. Steam may enter the stripping zone 78 through a distributor 92. A spent catalyst conduit 94 transfers coked catalyst, regulated by a control valve, to a catalyst regenerator 30. Additionally, a spent catalyst recycle conduit (not shown) may transfer some spent catalyst back to the riser 20 below the feed distributor arrangement 10 without undergoing regeneration.

As shown in the FIGURE, the catalyst regenerator 30 receives the coked catalyst through an inlet 32 and typically combusts the coke from the surface of the catalyst particles by contact with an oxygen-containing gas. The oxygen-containing combustion gas enters the bottom of the regenerator 30 via an inlet 34 to a combustion gas distributor 36. Flue gas and entrained catalyst pass upwardly through the regenerator 30. Flue gas exits the regenerator through a flue gas outlet 38.

The catalyst regenerator 30 comprises a regenerator vessel 40 comprising a lower chamber 42 and an upper chamber 44. The catalyst regenerator may be a two-stage regenerator in which air is delivered to the upper, first-stage chamber 44 and the lower, second-stage chamber 42. In a two-stage regenerator, about 20 to about 40 wt-% of the air is delivered to the lower chamber. Oxygen depleted air from the lower chamber and the balance of total air delivered to the catalyst regenerator are delivered to the upper chamber. The spent catalyst is first delivered to the first-stage chamber 44. Partially regenerated catalyst is then passed downwardly to the second-stage chamber 42 to contact fresh air and finish the regeneration process.

The catalyst regenerator 30 may also comprise a combustor regenerator as shown in the FIGURE. In a combustor regenerator, spent catalyst enters the lower chamber 42, called the combustion chamber, in which coke is combusted from the catalyst and catalyst and flue gas are transported from the lower chamber 42 to the upper chamber 44, called the disengaging chamber. A primary separator, such as a tee disengager 50, initially separates catalyst from flue gas. Regenerator cyclones 52, 54, or other means, remove entrained catalyst particles from the rising flue gas before the flue gas exits the vessel through the flue gas outlet 38. Combustion of coke from the catalyst particles raises the temperature of the catalyst. Disengaged catalyst collects in a dense bed 56 which is fluidized by air from distributor 58. Disengaged catalyst may exit from the regenerator vessel through a regenerated catalyst outlet 16 to a regenerator standpipe 18. The catalyst may pass, regulated by a control valve, through the regenerator standpipe 18 to the lower section 14 of the riser 20.

Regenerated catalyst from the regenerator standpipe 18 will usually have a temperature in a range from about 649° and about 760° C. (1200° to 1400° F.). If air is used as the oxygen-containing gas, the dry air rate to the regenerator may be between about 8 and about 15 kg/kg coke. The hydrogen in coke may be between about 4 and about 8 wt-%, and the sulfur in coke may be between about 0.6 and about 3.0 wt-%.

At least one catalyst cooler 100 is provided to cool regenerated catalyst. In the combustor regenerator 30, catalyst is transferred from the upper chamber 44 through a cooler catalyst outlet 102 through a hot catalyst conduit 104 to the catalyst cooler 100 through a hot catalyst inlet 106. The cooler catalyst outlet 102 is provided in the upper chamber, so hot catalyst is withdrawn from the upper chamber 44 for transport to the hot catalyst inlet 106. More than one catalyst cooler may be used although only one is shown in the FIGURE.

Catalyst cooler 100 shown in the FIGURE is a flow-through type cooler. Catalyst heat exchange tubes 120 are located in catalyst cooler 100 and cool the catalyst before it is withdrawn from the catalyst cooler 100 through the cooled catalyst exit 110 to a cooled catalyst pipe 108. The use of heat exchange tubes 120 allows the recovery and removal of heat from the catalyst caused by combustion of coke in the regenerator vessel 40. Preferably, there are between about 50 and about 250 heat exchange tubes 120 located in the catalyst cooler 100 and more preferably between about 75 and 200 heat exchange tubes 120. Heat is typically removed from the catalyst to produce steam which can be used elsewhere in the refinery. Catalyst control valve 112 regulates the amount of catalyst exiting cooled catalyst exit 110 through cooled catalyst pipe 108 and thus entering the catalyst cooler 100 from the regenerator vessel 40 and thereby controls the temperature in regenerator vessel 40.

Regenerated catalyst entering catalyst cooler 100 through hot catalyst inlet 106 contacts catalyst heat exchange tubes 120. Catalyst drifts downwardly through catalyst cooler 100 into a lower portion of the cooler and exits through cooled catalyst exit 110 below said hot catalyst inlet 106.

Catalyst cooler 100 is typically "cold-walled". The term "cold-walled" means that the metal shell 128 of the cooler 100 is coated with an inner insulative refractory lining. However, in an embodiment, the shell 128 may be without an insulative refractory lining which is considered "hot-walled." Additionally, parts of the cooler 100 may be additionally lined with an abrasion resistant coating. The shell 128 of the cooler 100 may be made of stainless steel.

The catalyst cooler 100 comprises an inlet manifold 114 and an outlet manifold 130. A lower tube sheet 118 may be bolted between a flange at the upper end of a lower head 122 of cooler 100 and a lower flange at a lower end of the outlet manifold 130. Upper tube sheet 132 may be bolted between a flange at the upper end of the outlet manifold 130 and a lower end of the shell 128 that defines the cooler 100. Grates 140 extend horizontally in the catalyst cooler 100 to stiffen the bundle of heat exchange tubes 120 vertically aligned in catalyst cooler 100. Grates 140 may define openings through which heat exchange tubes extend. There may be at least two layers of grates 140 in each catalyst cooler 100. Grates are secured to the heat exchange tubes 120 and to each other by vertical support rods which may be made of the same material as the heat exchange tubes 120. The grates 140 and the heat exchange tubes 120 are enabled to thermally expand together as necessary without binding.

In an embodiment, boiler feed water is the heat exchange fluid, but other types of heat exchange fluid are contemplated including water with additives to affect the boiling point of the fluid. Boiler feed water enters an inlet manifold 114 through cooling medium nozzle 116 at or near the bottom of catalyst cooler 100. In an embodiment, the inlet manifold 114 is defined between a lower tube sheet 118 and a bottom head 122 of the cooler. Preferably, catalyst heat exchange tubes 120 have an inlet and an outlet at or near the bottom of the cooler 100. Preferably catalyst heat exchange tubes 120 are bayonet-style tubes which each comprise an inner tube 124 and an outer tube 126. The inner tube 124 extends into and through a majority length of the outer tube 126. The inner tube 124 of heat exchange tube 120 is secured to, extends through and projects from a lower tube sheet 118. Inlets of inner tubes 124 fluidly communicate with inlet manifold 114. Boiler feed water entering inlet manifold 114 is directed up inner tube 124 of heat exchange tube 120. Boiler feed water travels up the length of the inner tube 124 and exits outlets of inner tubes 124. The boiler feed water then reverses direction and flows down the outer tube 126 which surrounds inner tube 124. The catalyst contacts an outer surface of outer tube 126 of catalyst heat exchange tubes 120.

Heat from the catalyst is indirectly exchanged with boiler feed water in outer tubes 126. The indirect heat exchange raises the temperature of the boiler feed water in outer tubes 126 and converts at least a portion of it to steam. This contact with outer tubes 126 lowers the temperature of the catalyst descending in the catalyst cooler 100. The heated boiler feed water and steam from outer tubes 126 are directed out of outlets of outer tubes 126 and into outlet manifold 130 defined between upper tube sheet 132 and the lower tube sheet 118 in the catalyst cooler 100. Outer tubes 126 are secured to, extend through and project from upper tube sheet 132. Outlets of outer tubes 126 fluidly communicate with outlet manifold 130. Fluid in outlet manifold 130 is then transported out of catalyst cooler 100 through nozzle 136 perhaps into a circulation drum where the vapor and heated boiler feed liquid are separated. The cooled catalyst then travels out of the catalyst cooler 100 through the cooled catalyst exit 110 into the cooled catalyst pipe 108 which communicates the catalyst cooler with the regenerator vessel 40 through a catalyst recirculation valve 112. In an aspect, the cooled catalyst pipe 108 communicates with a riser 150. Fluidizing gas is fed to the riser 150 to lift and deliver cooled catalyst from the riser 150 into the regenerator vessel 40, preferably into the lower chamber 42 of the regenerator 30. A catalyst distributor 152 may distribute catalyst through openings into the regenerator vessel 40.

A fluidizing gas is also directed downwardly in catalyst cooler 100 by distributor 138 with nozzles. Preferably distributor 138 is located above heat exchange tubes 120 with nozzles directing the fluidizing gas downwardly in catalyst cooler 100. A gas such as air is used to fluidize the catalyst particles entering catalyst cooler 100 through hot catalyst inlet 106. The flow rate of the fluidizing gas should be sufficiently high to accomplish fluidization of the catalyst. The fluidizing gas used in catalyst cooler 100 improves the heat transfer between catalyst and heat exchange tubes 120 by generating turbulence which enhances the heat transfer coefficient between the catalyst and the heat exchange tubes 120. The two ways to control the temperature of the circulated catalyst is to either control the amount of catalyst flowing through catalyst cooler 100 by the catalyst recirculation valve 112 or to vary the fluidizing gas rate distributed to catalyst cooler 100 through distributor 138.

A top of the catalyst cooler 100 is provided with a vent 144 for allowing fluidizing gas to exit the catalyst cooler. A vent pipe 146 communicates the vent 144 with the regenerator vessel 40 through a vent gas inlet 154. In an aspect, the vent pipe 146 communicates with the lower chamber 42 of the regenerator vessel 40. Air is vented to the lower chamber 42 separately from the cooled catalyst exiting in cooled catalyst pipe 108 and hot catalyst entering through hot catalyst inlet 106. Consequently, air exiting the catalyst cooler travels to the lower chamber 42 of the regenerator where it can be consumed in the combustion of coke from spent catalyst therein. Venting the fluidizing air to the lower chamber 42, is improved over venting air to the upper chamber 44, because the air does not promote after burn combustion in the upper chamber 44 but serves to assist combustion of coke in the lower chamber 42. Vented air in vent pipe 146 is directed downwardly after venting from said vent 144 and before entering said lower chamber 42 of said regenerator vessel 40. In an embodiment, the vent pipe may direct fluidizing gas upwardly from the catalyst cooler 100, then laterally, then downwardly and then laterally into the lower chamber 42 of the regenerator vessel 40. Consequently, the vent gas inlet is disposed at an elevation lower than the vent 144.

A disengaging portion 148 may be disposed in the catalyst cooler 100 between the hot catalyst inlet and the vent 144 above the gas distributor 138. The disengaging portion 148 provides a space in which catalyst may disengage from fluidizing gas before exiting the vent 144. The heat exchange tubes 120 are below the disengaging portion 148. In an aspect the vent 144 is spaced above said hot catalyst inlet 106 to provide the disengaging portion 148.

The heat exchange tubes may be made of a chromium-molybdenum-iron alloy because it is resistant to corrosion from trace chlorides in the boiler feed water if used as the heat exchange liquid.

The zeolitic molecular sieves used in typical FCC operation have a large average pore size and are suitable for the present invention. Molecular sieves with a large pore size have pores with openings of greater than 0.7 nm in effective diameter defined by greater than 10 and typically 12 membered rings. Suitable large pore molecular sieves include synthetic zeolites such as X-type and Y-type zeolites, mordenite and faujasite. Y-type zeolites with low rare earth content are preferred. Low rare earth content denotes less than or equal to about 1.0 wt-% rare earth oxide on the zeolitic portion of the catalyst. Catalyst additives may be added to the catalyst composition during operation. Medium pore sized molecular sieves such as MFI with openings of 0.7 nm or less may be blended in with the large pore molecular sieves to increase production of lighter olefins. In some cases, only medium pore sized molecular sieves may be used if the feed to the riser is an FCC product cut such as a naphtha stream.

The riser 20 may operate with catalyst-to-oil ratio of between about 4 and about 12, preferably between about 4 and about 10. Inert gas to the riser 20 may be between about 1 and about 15 wt-% of hydrocarbon feed, preferably between about 4 and about 12 wt-%. Before contacting the catalyst, the hydrocarbon feed may have a temperature in a range of from about 149° to about 427° C. (300 to 800° F.), preferably between about 204° and about 288° C. (400° and 550° F.). The riser 20 may operate in a temperature range of between about 427° and 649° C. (800° and 1200° F.), preferably between about 482° and about 593° C. (900° and 1100° F.). The pressure in the riser 20 may be between about 69 and about 241 kPa (gauge) (10 and 35 psig), preferably at about 103 kPa (gauge) (15 psig).

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. In a catalyst regenerator comprising a regenerator vessel having an inlet for catalyst and combustion gas, a regenerated catalyst outlet, a cooler catalyst outlet, a flue gas outlet, an upper chamber and a lower chamber; a catalyst cooler having a hot catalyst inlet in communication with the cooler catalyst outlet of said regenerator vessel, said catalyst cooler having a gas distributor, a vent provided at a top of said catalyst cooler so catalyst disengages from fluidizing gas before exiting the vent, a cooled catalyst exit and a plurality of heat exchange tubes in said catalyst cooler for carrying heat exchange fluid; a vent pipe communicating said vent with said regenerator vessel; the improvement of said vent pipe communicating said vent with said lower chamber of said regenerator vessel and a cooled catalyst pipe communicating said cooled catalyst exit with said regenerator vessel.

2. The catalyst regenerator of claim 1 comprising a disengaging portion in said catalyst cooler between said hot catalyst inlet and said vent.

3. The catalyst regenerator of claim 2 wherein said heat exchange tubes are below said disengaging portion.

4. The catalyst regenerator of claim 1 wherein a riser delivers cooled catalyst into the regenerator vessel.

5. The catalyst regenerator of claim 4 wherein said riser delivers cooled catalyst to said lower chamber.

6. The catalyst regenerator of claim 1 wherein said cooler catalyst outlet is provided in said upper chamber.

7. The catalyst regenerator of claim 1 wherein the cooler catalyst outlet is below the hot catalyst inlet.

8. The catalyst regenerator of claim 1 wherein the vent for allowing fluidizing gas to exit the catalyst cooler is provided at a top of the catalyst cooler.

9. The catalyst regenerator of claim 8 wherein a vent gas inlet is disposed at a lower elevation than the vent.

10. In a catalyst regenerator comprising: a regenerator vessel having an inlet for catalyst and combustion gas, a regenerated catalyst outlet, a cooler catalyst outlet, a flue gas outlet, an upper chamber and a lower chamber; a catalyst cooler having a hot catalyst inlet in communication with the cooler catalyst outlet of said regenerator vessel, said catalyst cooler having a gas distributor, a vent spaced above said hot catalyst inlet to provide a disengaging portion so catalyst disengages from fluidizing gas before exiting the vent, a cooled catalyst exit and a plurality of heat exchange tubes in said catalyst cooler for carrying heat exchange fluid; a vent pipe communicating said vent with said regenerator vessel; the improvement of said vent pipe communicating with said lower chamber and a cooled catalyst pipe communicating said cooled catalyst exit with said regenerator vessel.

11. The catalyst regenerator of claim 10 wherein said heat exchange tubes are below said disengaging portion.

12. The catalyst regenerator of claim 10 wherein said cooler catalyst outlet is provided in said upper chamber.

13. The catalyst regenerator of claim 10 wherein a riser delivers cooled catalyst into the regenerator vessel.

14. In a catalyst regenerator comprising: a regenerator vessel having an inlet for catalyst and combustion gas in a combustor chamber, a regenerated catalyst outlet and a flue gas outlet in a disengaging chamber and a cooler catalyst outlet provided in said disengaging chamber; a catalyst cooler having a hot catalyst inlet in communication with said cooler catalyst outlet of said regenerator vessel, said catalyst cooler having a vent provided at a top of said catalyst cooler so catalyst disengages from fluidizing gas before exiting the vent, a cooled catalyst exit and a plurality of heat exchange tubes in said catalyst cooler for carrying heat exchange fluid; a vent pipe communicating said vent with said regenerator vessel; the improvement of said vent pipe communicating with said combustor chamber and a cooled catalyst pipe communicating said cooled catalyst exit with said regenerator vessel.

15. The catalyst regenerator of claim 14 wherein said vent is above said hot catalyst inlet.

16. The catalyst regenerator of claim 14 wherein said heat exchange tubes are below said hot catalyst inlet.

17. The catalyst regenerator of claim 14 comprising a cooled catalyst pipe communicating said cooled catalyst exit with said combustor chamber.

18. The catalyst regenerator of claim 14 wherein said regenerator vessel includes a riser for delivering cooled catalyst to combustor chamber.

19. The catalyst regenerator of claim 14 wherein the cooler catalyst outlet is below the hot catalyst inlet.

20. The catalyst regenerator of claim 14 wherein the vent for allowing fluidizing gas to exit the catalyst cooler is provided at a top of the catalyst cooler.

\* \* \* \* \*